(12) United States Patent
Alabdulhadi

(10) Patent No.: US 11,477,226 B2
(45) Date of Patent: Oct. 18, 2022

(54) ONLINE SYSTEM IDENTIFICATION FOR DATA RELIABILITY ENHANCEMENT

(71) Applicant: Saudi Arabian Oil Company, Dhahran (SA)

(72) Inventor: Nawwaf S Alabdulhadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 598 days.

(21) Appl. No.: 16/392,734

(22) Filed: Apr. 24, 2019

(65) Prior Publication Data
US 2020/0344256 A1 Oct. 29, 2020

(51) Int. Cl.
*H04L 9/40* (2022.01)

(52) U.S. Cl.
CPC ........ *H04L 63/1433* (2013.01); *H04L 63/145* (2013.01); *H04L 63/1416* (2013.01); *H04L 63/205* (2013.01)

(58) Field of Classification Search
CPC . H04L 63/14; H04L 63/1416; H04L 63/1433; H04L 63/1441; H04L 63/145; H04L 63/20; H04L 63/205
See application file for complete search history.

(56) References Cited

U.S. PATENT DOCUMENTS

| | | |
|---|---|---|
| 9,009,837 B2 | 4/2015 | Nunez Di Croce |
| 9,183,397 B2 | 11/2015 | Futoransky et al. |
| 9,392,003 B2 * | 7/2016 | Amsler ............... H04L 63/20 |
| 10,038,711 B1 | 7/2018 | Gorodissky et al. |
| 10,469,521 B1 * | 11/2019 | Segal ................. H04L 63/20 |
| 10,673,887 B2 * | 6/2020 | Crabtree ............ G06F 11/3495 |
| 10,681,071 B1 * | 6/2020 | Pendergast .......... H04L 63/1425 |
| 10,915,523 B1 * | 2/2021 | Paiz .................... G06F 16/243 |
| 10,936,687 B1 * | 3/2021 | Paiz .................... G06F 16/3341 |
| 10,972,494 B2 * | 4/2021 | Cran ................... H04L 63/1433 |
| 2007/0168311 A1 * | 7/2007 | Genty ................. G06N 3/02 706/15 |

(Continued)

OTHER PUBLICATIONS

Vacas, Ivo et al. "Detecting network threats using OSINT knowledge-based IDS." 2018 14th European Dependable Computing Conference (EDCC). IEEE, 2018. 128-135.

(Continued)

*Primary Examiner* — Khang Do
(74) *Attorney, Agent, or Firm* — Leason Ellis LLP (57) ABSTRACT

A system, a method, and a computer program for identifying and prioritizing a risky computing resource for security evaluation and remediation in a computer network that has a plurality of computing resources, comprising analyzing network-internal domain information to identify the risky computing resource in the computer network, generating a keyword for a cyberattack risk, analyzing open source intelligence domain information using the keyword, analyzing network-external domain information to identify additional risk attributes for the cyberattack risk, determining a ranking weight for the cyberattack risk, prioritizing the risky computing resource with respect to one or more computing resources based on the ranking weight, targeting the risky computing resource for penetration testing in accordance with the prioritization, and evaluating a threat risk of the risky computing resource to the computer network.

16 Claims, 5 Drawing Sheets

(56) References Cited

U.S. PATENT DOCUMENTS

| | | | | |
|---|---|---|---|---|
| 2012/0180133 | A1* | 7/2012 | Al-Harbi | H04L 63/1433 726/25 |
| 2013/0276125 | A1* | 10/2013 | Bailey | G06F 21/577 726/25 |
| 2014/0344937 | A1* | 11/2014 | Sabin | H04L 63/1433 726/25 |
| 2016/0044054 | A1* | 2/2016 | Stiansen | H04L 63/1416 726/24 |
| 2016/0119365 | A1* | 4/2016 | Barel | G06F 16/84 726/12 |
| 2017/0098086 | A1* | 4/2017 | Hoernecke | G06Q 10/0635 |
| 2018/0032736 | A1* | 2/2018 | Inagaki | G06Q 10/0635 |
| 2018/0034842 | A1* | 2/2018 | Smyth | G06N 20/00 |
| 2018/0191771 | A1* | 7/2018 | Newman | H04L 63/1433 |
| 2018/0197128 | A1* | 7/2018 | Carstens | G06F 16/288 |
| 2018/0218085 | A1* | 8/2018 | Price | G06F 40/134 |
| 2018/0288087 | A1* | 10/2018 | Hittel | H04L 67/10 |
| 2018/0308026 | A1* | 10/2018 | Sinha | G06Q 10/0635 |
| 2018/0351987 | A1* | 12/2018 | Patel | G06F 21/577 |
| 2019/0034660 | A1* | 1/2019 | Ford | G06F 21/6245 |
| 2019/0102714 | A1* | 4/2019 | Albert | G06F 8/38 |
| 2019/0129705 | A1* | 5/2019 | Bulut | G06F 21/577 |
| 2019/0163914 | A1* | 5/2019 | Steele | G06F 21/577 |
| 2019/0166153 | A1* | 5/2019 | Steele | H04L 63/1441 |
| 2019/0230107 | A1* | 7/2019 | De Sapio | H04L 63/145 |
| 2019/0230129 | A1* | 7/2019 | Digiambattista | H04L 63/1441 |
| 2019/0268366 | A1* | 8/2019 | Zeng | G06N 3/0472 |
| 2019/0342324 | A1* | 11/2019 | Nawy | G06F 16/2228 |
| 2020/0099716 | A1* | 3/2020 | Sjouwerman | H04L 63/1416 |
| 2020/0120126 | A1* | 4/2020 | Ocepek | H04L 63/1433 |
| 2020/0135049 | A1* | 4/2020 | Atencio | G09B 19/0053 |
| 2020/0167481 | A1* | 5/2020 | Steele | H04L 63/10 |
| 2020/0167705 | A1* | 5/2020 | Risoldi | G06N 5/02 |
| 2020/0280578 | A1* | 9/2020 | Hearty | G06Q 40/025 |
| 2020/0285737 | A1* | 9/2020 | Kraus | G06F 21/554 |
| 2021/0203686 | A1* | 7/2021 | Kazato | H04L 63/1433 |

OTHER PUBLICATIONS

Holik, Filip, et al. "Vulnerabilities of modern web applications." 2017 40th International Convention on Information and Communication Technology, Electronics and Microelectronics (MIPRO). IEEE, 2017. 1256-1261.

Grossmann, Juergen et al. "A trace management platform for risk-based security testing." International Workshop on Risk Assessment and Risk-driven Testing. Springer, Cham, 2013. 120-135.

"Methods for Testing & Specifications Risk-based Security Testing Methodologies; EG 203251" ETSI Draft; EG 203521, European Institute (ETSI), 650, Oute Des Lucioles; F-06921. 1-60.

Matheu-Garca, Sara N., et al. "Risk-based automated assessment and testing for the cybersecurity certification and labelling of IoT devices." Computer Standards & Interfaces 62 (2019): 64-83.

International Search Report and Written Opinion in Corresponding PCT Application No. PCT/US2020/029282 dated Jul. 23, 2020. 14 pages.

RiskSense Platform Solution Brief, copyright 2017, available at https://risksense.com/wp-content/uploads/2018/10/Solution-Brief_RiskSensePlatform.pdf.

* cited by examiner

OSINT DOMAIN RANKING (5)

RECONNAISSANCE (2)
SE NOT APPLICABLE −1
AVAILABLE DIRECT/INFER DATA −1

RATIONALITY (3)
NOT TRENDING −2
NO MALICIOUS COMMUNITY −1

NETWORK-EXTERNAL DOMAIN RANKING (5)

RELEVANCY (2)
NOT REGION/TECH RELEVANT −1
NOT INDUSTRY RELEVANT −1

LIKELIHOOD (3)
NO THREAT ACTOR −1
NO CAPABILITY −1
NO MOTIVE −1

NETWORK-INTERNAL DOMAIN RANKING (5)

RECENCY (2)

| YEAR | Points (-) |
|---|---|
| CURRENT | 0 |
| BEFORE 1-3 | −1 |
| BEFORE 3 | −2 |

RISK (3)

| RISK LEVEL | PT ADJUST |
|---|---|
| RANK LESS THAN HIGH | −1 |
| LIKELIHOOD LESS THAN HIGH | −1 |
| IMPACT LESS THAN HIGH | −1 |

FIG. 4

| RISK | RISK DESCRIPTION | NETWORK-INTERNAL DOMAIN RANKING | OSINT DOMAIN RANKING | NETWORK-EXTERNAL DOMAIN RANKING | OVERALL RANKING |
|---|---|---|---|---|---|
| Risk Type: Internal Threat Actor<br>Risk Addressed: Yes, Year 2018<br>Risk Rating: High<br>Risk Impact: High<br>Risk Likelihood: Medium | | 3 | 4 | 5 | 80% |

ONLINE SYSTEM IDENTIFICATION FOR DATA RELIABILITY ENHANCEMENT

TECHNOLOGICAL FIELD OF THE DISCLOSURE

The present disclosure relates to a method, a system, an apparatus and a computer program for identifying or prioritizing computing resources for penetration testing, risk analysis or severity determination, or for remediation or mitigation of vulnerabilities in a computer network.

SUMMARY OF THE DISCLOSURE

According to one non-limiting embodiment of the disclosure, a method is provided for identifying and prioritizing a risky computing resource for security evaluation and remediation in a computer network that has a plurality of computing resources. The method comprises: analyzing network-internal domain information to identify the risky computing resource in the computer network; generating a keyword for a cyberattack risk that is related to the risky computing resource; analyzing open source intelligence (OSINT) domain information using the keyword to identify risk attributes for the cyberattack risk; analyzing network-external domain information to identify additional risk attributes for the cyberattack risk; determining a ranking weight for the cyberattack risk based on the identified risk attributes determined by analyzing the OSINT domain information and the identified additional risk attributes determined by analyzing the network-external domain information; prioritizing the risky computing resource with respect to one or more computing resources in the plurality of computing resources based on the ranking weight; targeting the risky computing resource for penetration testing in accordance with the prioritization; and evaluating a threat risk of the risky computing resource to the computer network, wherein the threat risk is exploitable by a threat actor computing device to gain access to the computer network through the risky computing resource.

The method can further comprise: selecting the penetration testing solution based on the network-internal domain information, OSINT domain information, and network-external domain information; or applying a penetration testing solution to the targeted risky computing resource; or communication with an analyst computing resource to apply the penetration testing solution to the risky computing resource; or applying a risk remediation solution to the risky computing resource to mitigate or remediate the threat risk.

Analyzing the network-internal domain information to identify the risky computing resource in the computer network can comprise analyzing an information technology risk register.

Analyzing the OSINT domain information using the keyword to identify risk attributes for the cyberattack risk can comprise querying a plurality of external networks.

Analyzing the network-external domain information to identify additional risk attributes for the cyberattack risk can comprise receiving a security web feed and searching the security web feed based on the keyword.

Determining the ranking weight for the cyberattack risk can comprise determining a network-internal domain ranking weight, a network-external domain ranking weight, and an OSINT domain ranking weight. Determining the ranking weight for the cyberattack risk can further comprise determining a sum of the network-internal domain ranking weight, network-external domain ranking weight, and OSINT domain ranking weight.

The network-internal domain ranking weight can comprise a recency weight factor and a risk weighting factor.

The network-external domain ranking weight can comprise a relevancy weighting factor and a likelihood weighting factor.

The OSINT domain ranking weight can comprise a reconnaissance weighting factor and a rationality weighting factor.

According to another non-limiting embodiment of the disclosure, a network security system is provided that identifies and prioritizes a risky computing resource for security evaluation and remediation in a computer network that has a plurality of computing resources. The network security system comprises: a network-internal domain (NID) risk assessor that identifies the risky computing resource from the plurality of computing resources in the computer network and generates a keyword for a cyberattack risk that is related to the risky computing resource; an open source intelligence (OSINT) fusor that determines first risk attributes for the cyberattack risk based on OSINT domain information based on the keyword; a network-external domain (NED) risk assessor that determines second risk attributes for the cyberattack risk based on network-external domain based on the keyword; and a risk evaluator that determines a ranking weight for the cyberattack risk based on the first risk attributes and second risk attributes and targets the risky computing resource for penetration testing according to the ranking weight, wherein the risk evaluator determines a threat risk of the risky computing resource to the computer network, wherein the threat risk is exploitable by a threat actor computing device to gain access to the computer network through the risky computing resource.

The OSINT fusor can determine an additional keyword for the cyberattack risk.

The NED risk assessor can determine the second risk attributes for the cyberattack risk based on said keyword and said additional keyword.

The risk evaluator can apply a penetration testing solution to the targeted risky computing resource.

The risk evaluator can communicate with an analyst computing resource to apply the penetration testing solution to the risky computing resource.

The risk evaluator can apply a risk remediation solution to the risky computing resource to mitigate or remediate the threat risk.

According to another non-limiting embodiment of the disclosure, a non-transitory computer readable storage medium storing network security evaluation and remediation program instructions for causing a risky security computing resource to be identified and prioritized amongst a plurality of computing resources in a computer network for security evaluation and remediation is provided. The program instructions comprise the steps of: analyzing network-internal domain information to identify the risky computing resource in the computer network; generating a keyword for a cyberattack risk that is related to the risky computing resource; analyzing open source intelligence (OSINT) domain information using the keyword to identify risk attributes for the cyberattack risk; analyzing network-external domain information to identify additional risk attributes for the cyberattack risk; determining a ranking weight for the cyberattack risk based on the identified risk attributes determined by analyzing the OSINT domain information and the identified additional risk attributes determined by analyzing the network-external domain information; prioritizing the risky computing resource with respect to one or more computing resources in the plurality of computing resources based on the ranking weight; targeting the risky computing resource for penetration testing in accordance with the prioritization; and evaluating a threat risk of the risky computing resource to the computer network, wherein the threat risk is exploitable by a threat actor computing device to gain access to the computer network through the risky computing resource. Analyzing the network-internal domain information to identify the risky computing resource in the computer network can comprise analyzing an information technology risk register. Analyzing the OSINT domain information using the keyword to identify risk attributes for the cyberattack risk can comprise querying a plurality of external networks. Analyzing the network-external domain information to identify additional risk attributes for the cyberattack risk can comprise receiving a security web feed and searching the security web feed based on the keyword. Determining the ranking weight for the cyberattack risk can comprise determining a network-internal domain ranking weight, a network-external domain ranking weight, and an OSINT domain ranking weight.

The program instructions can comprise the further step(s) of: selecting the penetration testing solution based on the network-internal domain information, OSINT domain information, and network-external domain information; or applying a penetration testing solution to the targeted risky computing resource; or communicating with an analyst computing resource to apply the penetration testing solution to the risky computing resource; or applying a risk remediation solution to the risky computing resource to mitigate or remediate the threat risk.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Computer networks are continuously exposed to cyberattack threats, many of which can be catastrophic to a computer network or the entity that owns or controls the network if successfully exploited. Network security systems, therefore, constantly monitor, detect, assess and resolve or prepare countermeasures to address risks in computer networks. However, since the networks are made of computing resources that are developed or made using complex proprietary platforms, specific protocols and security architectures, and because new threats continuously arise, organizations frequently use internal hacker teams (or red teams) to carry out adversary cybersecurity penetration testing exercises ("penetration testing solutions") in their computer networks to evaluate security and identify security risks that can be exploited to attain unauthorized access to computing resources in the network.

Selecting an effective penetration testing solution in a timely manner can be extremely challenging, if not impossible to do for a team of individuals. Network security systems rely on vast numbers of complex communication and information systems that are continuously changing and growing in scale, so it can be difficult or impossible to timely select a penetration testing solution that can be applied to effectively evaluate security and identify risks. In fact, red team members frequently fail to timely select appropriate or effective penetration testing solutions, thereby leaving critical risks unaddressed and potentially exploitable by threat actors.

The disclosure provides a network security solution that can timely, efficiently and effectively identify and prioritize risks in a computer network, and that can also identify and prioritize computing resources in the computer network that might be subject to such risks ("risky computing resources"). The network security solution can identify and prioritize penetration testing solutions to evaluate those risks and risky computing resources, thereby reducing any likelihood that a high-level risk will be left unaddressed and vulnerable to exploitation by malicious actors. A high-level risk can include a risk or vulnerability in a computing resource that can have significant or important adverse impact or effect on a portion of the computer network or the entity that owns or controls the computer network.

Figure 1:
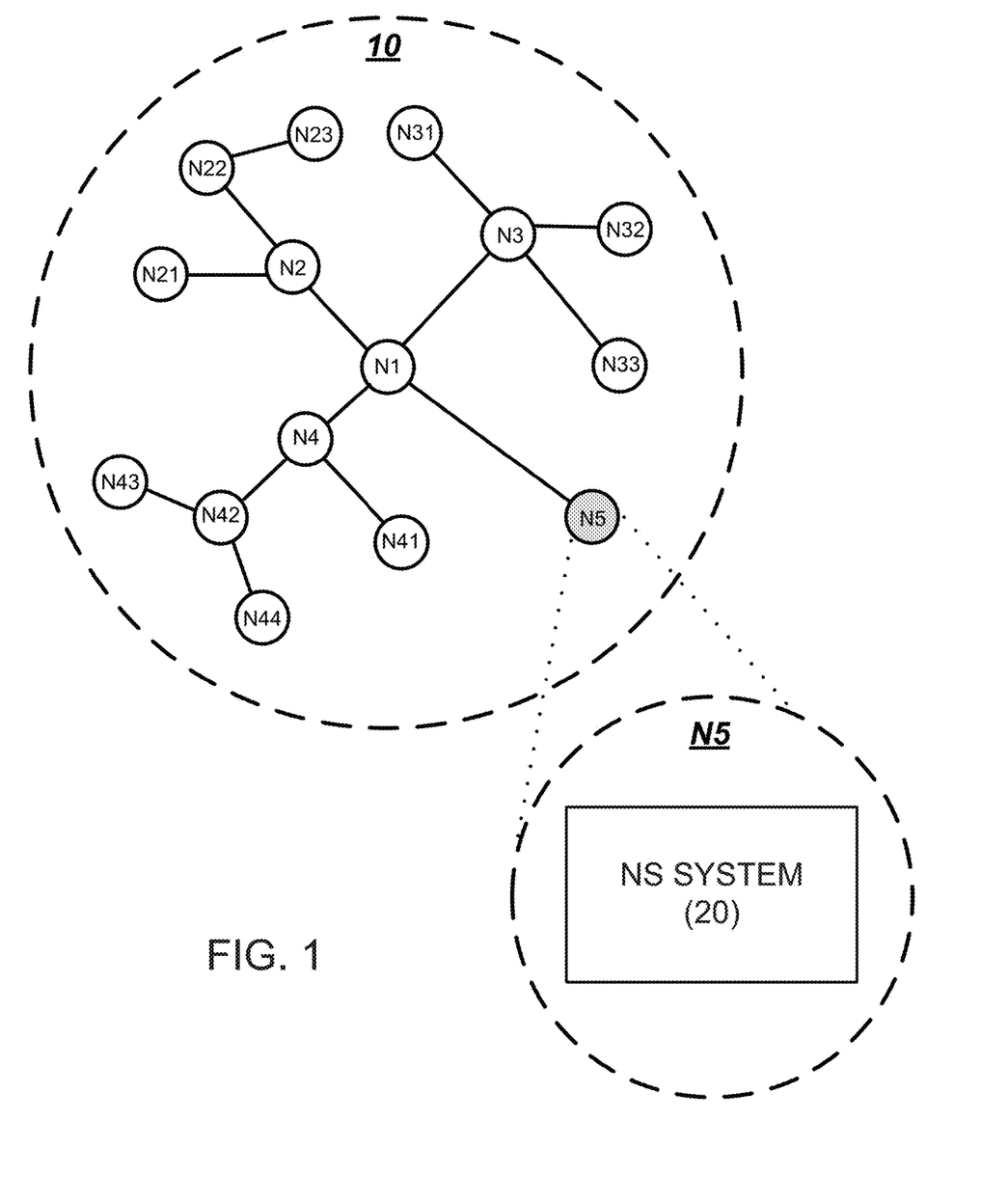
FIG. 1 shows a computer network that is provided with a network security solution according to the principles of the disclosure.

FIG. 1 shows an example of a computer network 10 that is provided with the network security solution, according to the principles of the disclosure. The computer network 10 can include a private network, a private enterprise network, a corporate network, an academia network, a military network, or a government network. Any one or more of a plurality of nodes N in the network 10 can include a computing resource that can be connected to an external network (not shown), such as, for example, the Internet, or a communicating device (not shown) that is located internally or externally to the computer network 10. The computer network 10 can include a firewall (not shown). The network security solution includes a network security (NS) system 20, which can be included in one or more nodes N (for example, node N5) in the computer network 10. As seen in FIG. 1, the computer network 10 can include a plurality of nodes N1, N2, N21, N22, N23, N3, N31, N32, N33, N4, N41, N42, N43, N44, and N5 (collectively or individually referred to as a node "N"). The NS system 20 can be implemented by, for example, a red team, an enterprise internal white hacker team, or any other individual or group of individuals tasked with adversary cybersecurity exercise's simulation, penetration testing, vulnerability detection, vulnerability identification, or vulnerability remediation or mitigation. The NS system 20 can be implemented autonomously, without any human intervention.

The NS system 20 can be used in red team applications to identify and prioritize risks or risky computing resources in the computer network 10. The NS system 20 can link enterprise requirements for the computer network 10 to red team penetration testing solution requirements and prioritize red team penetration testing plans based on severity, urgency, or potential impact. The NS system 20 can identify and prioritize risky computing resources and create penetration testing solutions or identify and select previously created penetration testing solutions to evaluate security and identify risks in the computer network 10. The NS system 20 can carry out one or more penetration testing solutions on targeted computing resources. The NS system 20 can prioritize the identified risks based on severity, urgency, or potential impact on the computing resource, the computer network 10, or the entity that owns or controls the computer network or computing resource.

The NS system 20 can communicate with a computing resource at a security analyst location ("analyst computing resource") and provide the information necessary for the analyst computing resource to perform analysis or remediation of identified and prioritized risks. Alternatively, the NS system 20 can autonomously perform the analysis or remediation, without any user intervention or interaction.

The NS system 20 eliminates one of the most challenging tasks faced by internal hacker teams—identifying and penetration testing business-oriented computing resources. The NS system 20 provides a penetration testing solution that can include, for example, a red team exercise selection criteria framework that facilitates efficient and effective penetration testing. The NS system 20 can identify and prioritize computing resources that include business-oriented risks in the computer network 10 for targeted cybersecurity penetration testing, risk analysis, severity determination, and risk remediation.

According to a non-limiting embodiment, the NS system 20 can analyze source data from three distinct knowledgebase domains, including a network-internal domain, an open source intelligence (OSINT) domain, and a network-external domain to identify, prioritize, and evaluate risks and risky computing resources in the computer network 10. The NS system 20 can generate or select a penetration testing solution based on analyzed source data from all three knowledgebase domains. The NS system 20 can prioritize each risk or risky computing resource for penetration testing and timely generate or select a penetration testing solution that is appropriate for the risk or risky computing resource. The NS system 20 can weight the results of an analysis to identify and prioritize risks or risky computing resources for penetration testing and evaluation. The risks or risky computing resources can be prioritized based on, for example, the values and needs of an assessed security posture for all or part of the computer network 10 or the protected asset value related to each computing resource.

After identifying and prioritizing risky computing resources for penetration testing, the NS system 20 can carry out prioritized penetration testing and evaluate security to identify or assess risks. Alternatively, the NS system 20 can communicate with an analyst computing resource that can carry out analysis or penetration testing on the risky computing resources. In communicating with the analyst computing resource, the NS system can transmit identifying information, such as, for example, an Internet Protocol (IP) address, a device name, a device location, a file name, a file location, a program name, a program location, or any other information that can enable the analyst computing resource to locate and target the risky computing resources for analysis and penetration testing. The information provided to the analyst computing resource by the NS system 20 can include, in addition to the identifying information, a priority or ranking level for each identified risky computing resource, so that the most urgent or critical risks can be addressed first.

After carrying out penetration testing and assessing risks, the identified risks can be remediated or countermeasures implemented by, or as a result of communications from the NS system 20. The NS system 20 can implement a risk remediation solution that remediates the risk or employ countermeasures that mitigate the risk, or it can communicate with the analysist computing resource, which, in turn, can implement the risk remediation solution.

Figure 2:
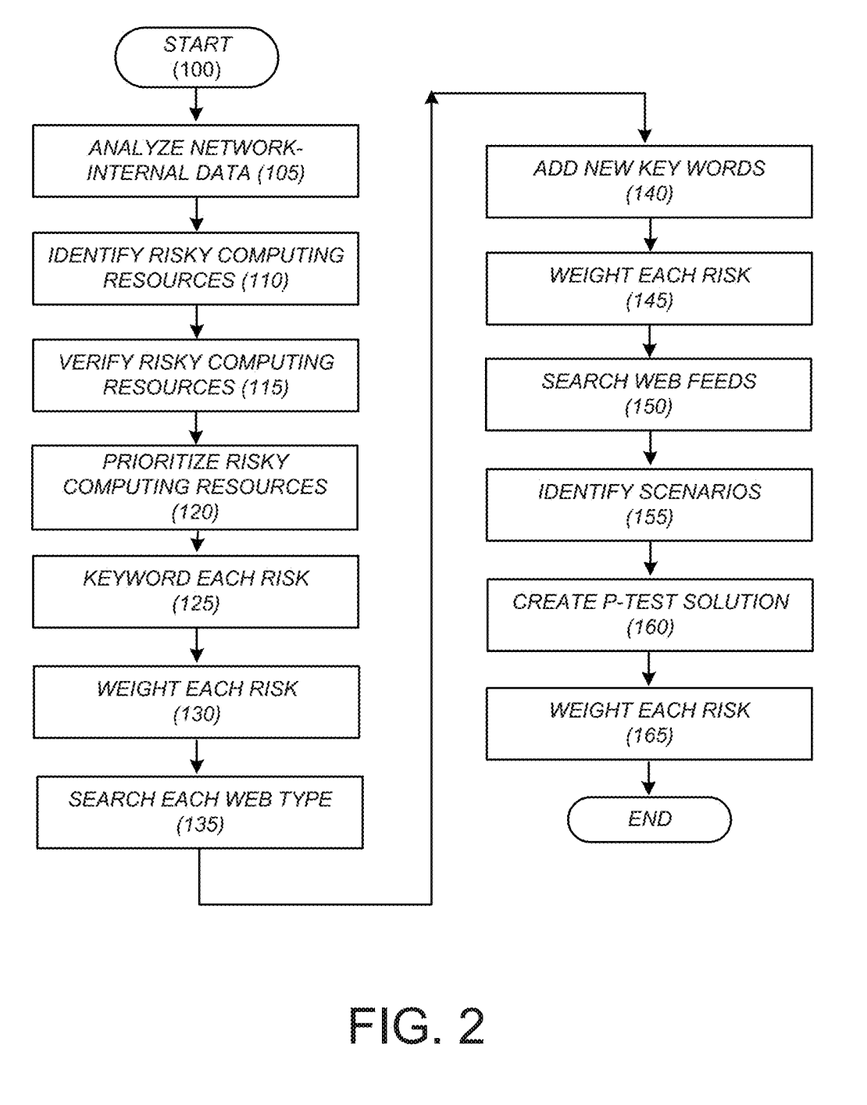
FIG. 2 shows an example of a risk assessment process for identifying and prioritizing risks in a computer network for penetration testing, according to a non-limiting embodiment of the disclosure.

FIG. 2 shows an example of a risk assessment process 100 for identifying and prioritizing risks in a computer network for penetration testing, according to a non-limiting embodiment of the disclosure. Initially, the NS system 20 can access and analyze data from data sources in the network-internal domain, such as, for example, IT risk logs, internal security risk assessments, and IT audits (Step 105) and identify risks and risky computing resources based on the analysis (Step 110).

The network-internal domain can include, for example, security and risk management data sources, asset security data sources, communications and network security data sources, identify and access management data sources, security assessment and testing data sources, security operations data sources, software development security data sources, or any other source that can provide security-related information regarding the computing resources in the computer network 10. The network-internal domain data can include, for example, information technology (IT) risk register logs (or risk logs), internal security results data of IT risk and vulnerability assessments, internal security results data of IT audits, or any other internal source of data in the computer network 10 that can provide information regarding risks or risky computing resources in the computer network 10. The network-internal domain data can include IT rules or polices. The risk register logs can include computing resource and case information related to an enterprise infrastructure in the computer network 10. The computing resource information can include identified risks or risky computing resources in the nodes N. The case information can include one or more use cases for each identified risk or risky computing resource in the computer network 10.

The risks and risky computing resources can be verified by analyzing risk assessments (Step 115). Each of the verified risky computing resources (and associated risks) can be prioritized, such that, for example, the most urgent or important risks are tested and evaluated first (Step 120). The NS system 20 can generate a keyword or list (or table) of keywords related to each risk or risky computing resource (Step 125). The NS system 20 can determine a weight for each risk or risky computing resource according to the weighting system to provide weighted risks or weighted risky computing resources (Step 130). The results from Steps 105 to 130 can be stored in the network risk register.

Figure 4:
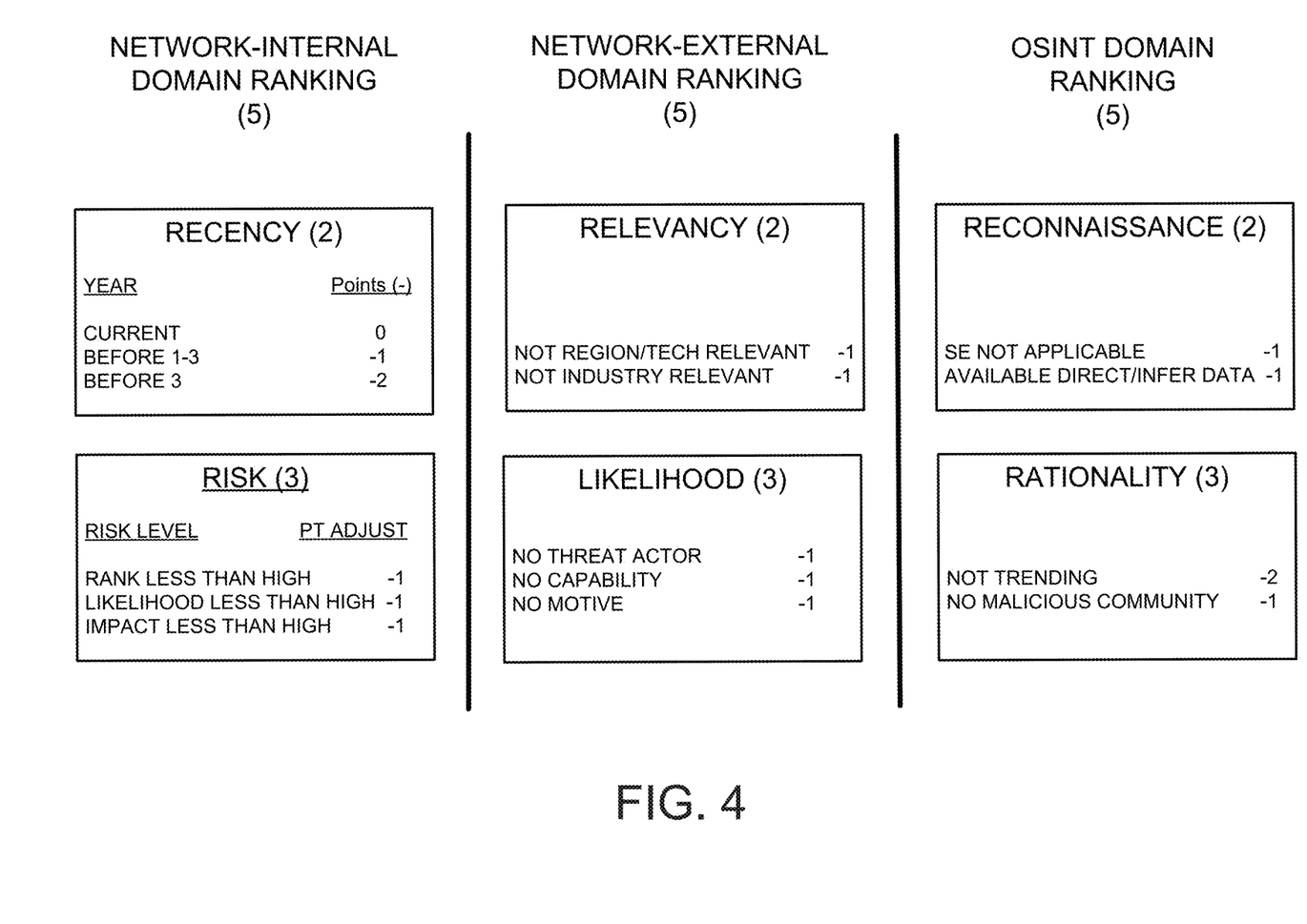
FIG. 4 shows an example of a weighting system that can be included in the network security solution in FIG. 1.

FIG. 4 shows a non-limiting embodiment of a weighting system that can be included in the NS system 20 and implemented to weight the risks or risky computing resources according to a risk ranking (for example, risk ranking 200, shown in FIG. 5) (Step 130). The weighting system can determine the risk ranking based on a network-internal domain ranking, an OSINT domain ranking, and a network-external domain ranking. In the non-limiting example shown in FIG. 4, a maximum total weighting value of five (5) points is arbitrarily allotted for each of the three rankings, for illustrative purposes. The ranking maximum total weight values can be less than or greater than 5 points. The ranking maximum total weight values can be different for one, two, or all three rankings, so that different maximum weights can be allottable for the different rankings. The ranking maximum total weight value can be a whole number or a fraction. Each ranking weight can be based on one or more weighting factors. The ranking weights can be adjusted and applied based on the results of an analysis of data received from each of the three knowledgebase domains, such as, for example, at Steps 130, 145 or 165, in FIG. 2.

The network-internal ranking weight can be determined based on, for example, a recency weighting factor (for example, up to 2 points) and a risk weighting factor (for example, up to 3 points). The weighting system can determine the network-internal ranking weight by adding the weights of all weighting factors. The weight for each weighting factor can depend on whether one or more conditions are determined to have been met. For instance, the weight for the recency factor can depend on how recently (if at all) an IT risk assessment was carried out for the risky computing resource; and, the weight for the risk factor can depend on the general rank, likelihood, or impact of a risk in the IT risk register.

Similarly, the OSINT domain ranking and network-external domain ranking weights can each be determined by one or more weighting factors. As seen in the non-limiting example in FIG. 4, the network-external domain ranking weight can depend on a relevancy weighting factor and a likelihood weighting factor, and the OSINT domain ranking weight can depend on a reconnaissance weighting factor and a rationality weighting factor.

In Step 130, the NS system 20 can evaluate each identified risk or risky computing resource and determine the recency weighting factor and risk weighting factor by analyzing the associated risk level, risk likelihood, risk impact, and the date (if any) that an IT risk assessment was last carried for the risk or risky computing resource. If it is determined for instance that an IT risk assessment was recently done (CONDITION: YEAR=CURRENT; WEIGHT ADJUSTMENT=0 points), then a zero (0) point weight adjustment is made to the allotted weight (for example, 2 points) for the weighting factor, whereby the full weight (2 points) is determined for the recency weighting factor. At the same (or a different) time, a determination can be made regarding the risk weighting factor, and if it is determined, for instance, that the risk level is less than high (CONDITION: "RANK LESS THAN HIGH"; WEIGHT=−1 point), or the likelihood of occurrence is less than high (CONDITION: "LIKELIHOOD LESS THAN HIGH"; WEIGHT=−1 point), or the impact is less than high (CONDITION: "IMPACT LESS THAN HIGH"; WEIGHT=−1 point), then a minus-one (−1) point adjustment is made to the allotted weight (for example, 3 points) for the weighting factor, whereby a two (2) point weight is determined (3 points−1 point=2 points) for the risk weighting factor. In this instance, the use case can store a network-internal domain ranking weight of four (4) points (=2 points recency weighting factor weight+2 points risk weighting factor weight).

However, if it is determined that the IT risk assessment was done between one (1) and three (3) years ago (CONDITION: YEAR=BEFORE 1-3; WEIGHT ADJUSTMENT=−1 point) or before three (3) years ago (CONDITION: YEAR=BEFORE 3; WEIGHT ADJUSTMENT=−2 points), then a minus-one (−1) point or a minus-two (−2) point weight adjustment is respectively made to the allotted weight for the recency weighting factor, whereby a one (1) point or a zero (0) point, respectively, recency weighting factor weight is determined for the risk or risky computing resource. At the same (or a different) time, if it is determined that the risk level is ranked less than a high level in the general rank, and the occurrence likelihood of the risk is less than high, and the impact potential is less than high in the IT risk register (CONDITION: "RANK LESS THAN HIGH" and "LIKELIHOOD LESS THAN HIGH" and "IMPACT LESS THAN HIGH"; WEIGHT ADJUSTMENT=−1+−1+−1=−3 points), then a minus-three (−3) point weight adjustment is made to the allotted weight, whereby a zero (0) point weight is determined for the risk weighting factor. In this instance, the use case can store a network-internal domain ranking weight of either one (1) point or zero (0) points for the network-internal domain ranking weight (1 point or 0 points for the recency weighting factor weight+0 points for the risk weighting factor weight).

The results of the analysis, including identification information for all risky computing resources, risks, keywords, network-internal domain ranking weight values (including, for example, recency weighting factor weight and risk weighting factor weight), network-external domain ranking weight values (including, for example, relevance weighting factor weight and likelihood weighting factor weight), and OSINT domain ranking weight values (including, for example, reconnaissance weighting factor weight and rationality weighting factor weight) can be saved in the network risk register. The network risk register (not shown) can be located in the NS system 20, or elsewhere, such as, for example, a database at one or more nodes in the computer network 10.

The NS system 20 can modify the analysis performed in, or the results of any one or more of the Steps 105 to 130 based on or as a result of an analysis of data in the OSINT domain or network-external domain. The NS system 20 can modify the order in which the analysis is carried out in Steps 105 to 130, or it can omit or skip one or more of the Steps 105 to 130.

After risks/risky computing resources are identified, prioritized, keywords generated, and the risks or risky computing resources weighted based on network-internal domain data, the NS system 20 can reference the keywords or retrieve the keywords associated with each risk or risky computing resource from the network risk register and execute searches of data sources in the OSINT domain, such as, for example, the dark web, deep web, and surface web based on the retrieved keywords using Internet search tools and OSINT tools, such as, for example Datasploit and Maltego (Step 135). Any new keywords found or determined during the searches of OSINT domain data sources can be added to each keyword list, table, or database that is associated with the risky computing resource or risk (Step 140). The NS system 20 can apply the weighting system (shown in FIG. 4) to further weight the risks or risky computing resources based on the analysis of the OSINT domain data (Step 145).

The OSINT domain can include a variety of OSINT data sources that can be employed individually or collectively to gather risk-related information from various resources, repositories, databases, or communities, such as, for example, social media platforms, including, for example, Twitter and Twitter developers, Facebook and Facebook developers, Shodan and Shodan repositories, and application program interfaces (APIs). The various resources, repositories, databases, and communities can provide information such as, for example, threat actor, mean, and motive factors. The OSINT domain data sources can include data fusion tools, frameworks, and surfaces such as the dark web, the deep web, and the surface web. Searching the webs can be done in a variety of ways, such as, for example, using virtual private networks (VPNs) or the TOR (The Onion Router) browser to access the dark web. Searching the deep web can be achieved by using OSINT data fusion tools such as Datasploit, Maltego, and Racon-ng, among others, or by using special search engines such as <www.findsmarter.com>, <www.dogpile.com>, or <www.yipp.com>.

Referring to the non-limiting example of the weighting system in FIG. 4, the NS system 20 can determine a risk ranking weight value for each risk or risky computing resource (Step 145, shown in FIG. 2). The weighting system can determine the OSINT domain ranking weight for each risk or risky computing resource based on whether certain conditions are determined to have been met based on the search results or analysis of the OSINT domain data. The OSINT domain ranking weight (including weighting factor weights) can be stored in the network risk register. In this non-limiting example, the total adjusted OSINT domain ranking weight value can be applied for each risk or risky computing resource.

The OSINT domain ranking weight can be determined based on the reconnaissance weighting factor (for example, up to 2 points) and rationality weighting factor (for example, up to 3 points). The weighting system can operate by adding the weighting factor weights for a total OSINT ranking weight.

In Step 145 (shown in FIG. 2), the NS system 20 can evaluate each identified risk or risky computing resource based on the results or analysis of the OSINT domain data and determine the OSINT domain ranking weight by summing the reconnaissance weighting factor weight and rationality weighting factor weight. For instance, the NS system 20 can determine from its analysis of the OSINT domain data whether a given risk can be exploited through social engineering (SE) or if data regarding exploiting the risk can be found directly or inferred from aggregated data. The NS system 20 can further determine whether the risk is trending, supported or motivated by a malicious community. If it is determined, for instance, that the risk cannot be exploited through social engineering (CONDITION: "SE NOT APPLICABLE"; WEIGHT ADJUSTMENT=−1) and that the risk is currently not trending and not motivated by a malicious community (CONDITION: "NOT TRENDING"; WEIGHT ADJUSTMENT=−2; CONDITION: "NO MALICIOUS COMMUNITY"; WEIGHT ADJUSTMENT=−1), then a minus-one (−1) point adjustment can be made to the allotted weight for the reconnaissance weighting factor and a minus-three (−3) point adjustment can be made to the allotted weight for the rationality weighting, wherein the OSINT domain ranking weight value will be determined to be one (1) point (=1 point reconnaissance weighting factor weight+0 point rationality weighing factor weight). In this non-liming example, the OSINT ranking can be up to 5 points and divide into two weighting factors—the reconnaissance weighting factor with two points and rationality weighting factor with three points.

Using the keywords in the keyword lists, tables or database, which may have been determined based on the network-internal domain data and OSINT domain data, the NS system 20 can carry out searches of data sources in the network-external domain, such as, for example, Kaspersky and FireEye web feeds (Step 150) and identify scenarios, including penetration testing solutions, that match or correlate to each identified risk (Step 155). The identified scenarios can include risk remediation solutions that match or correlate to the identified risks. Based on the search results, the NS system 20 can generate or select penetration testing solutions, including, for example, tactics, techniques, and procedures to be executed to test for each risk in a target risky computing resource (Step 160). The risks or risky computing resources can be weighted by the NS system 20 based on the network-external domain data (Step 165). The NS system 20 can execute risk remediation solutions to remediate risks or risky computing resources that have been tested.

The network-external domain can include, for example, data feeds from a variety of communicating devices (not shown) or networks (not shown) that are external to the computer network 10. The network-external domain data can be received via a network interface 25 (shown in FIG. 3) from the external communicating devices or networks via, for example, one or more web feeds, such as, for example, an RDF (Resource Description Frameworks), a RSS (Rich Site Summaries or Really Simple Syndications) or an Atom web feed. The communicating devices or networks can belong to, for example, a commercial entity (for example, a vendor), a government entity, a military entity, an academia entity, or a private entity. The web data feeds can include leading industrial feeds that describe the latest cyber-attacks in detail and include examples and explanations of applicable tactics, techniques, and procedures to execute the threat use cases.

Referring to the non-limiting example of the weighting system in FIG. 4, the NS system 20 can determine the network-external domain ranking weight value for each risk or risky computing resource (Step 165, shown in FIG. 2). Each risk or risky computing resource can be weighted based on the analysis results or the analysis of the network-external domain data by the NS system 20. In this non-limiting example, the additional total weight value that can be applied for a given risk or risky computing resource is set to a maximum of five points (5). However, as discussed above, the maximum total weight value can be less than 5 points or greater than 5 points. The network-external ranking weight can be determined based on the relevancy weighting factor (for example, up to 2 points) and the likelihood weighting factor (for example, up to 3 points). The network-external ranking weight value can be determined by summing the relevancy weighting factor weight and likelihood weighting factor weight. The NS system 20 can use the results of its analysis of network-external domain data do adjust weighting factor weights depending on whether one or more conditions in the weighting system are met.

In Step 165 (shown in FIG. 2), the NS system 20 can evaluate each identified risk or risky computing resource based on the analysis results or analysis of the network-external domain data and determine the relevancy weighting factor weight and likelihood weighting factor weight. For instance, the NS system 20 can determine from its analysis of network-external domain data whether a given risk (or use case) was conducted in, for example, the same or related region or technology or industry of network owner or operator or the computer network 10 or risky computing resource. If it is determined, for instance, that the risk was not in the same geographic region or relevant technology (CONDITION: "NOT REGION" or "NOT TECH RELEVANT"; WEIGHT ADJUSTMENT=−1 point) or industry (CONDITION: "NOT INDUSTRY RELEVANT"; WEIGHT ADJUSTMENT=−1 point), then a minus-two (−2) point adjustment can be made to the allotted weight for the relevancy weighting factor to determine a relevancy weighting factor weight of zero (0) points, whereby a minus-one (−1) point adjustment is made because of the different region or technology and another minus-one (−1) adjustment is made because of the different industry.

At the same (or a different) time, a determination can be made whether the risk has a potential threat actor (CONDITION: "NO THREAT ACTOR"; WEIGHT ADJUSTMENT=−1), an existing capability (CONDITION: "NO CAPABILITY"; WEIGHT ADJUSTMENT=−1), or a motive (CONDITION: "NO MOTIVE"; WEIGHT ADJUSMENT=−1). If one or more of the conditions are determined to be true, then the allotted weight for the likelihood weighting factor will be adjusted by the corresponding number of points, subtracting −1 point from the allotted likelihood weighting factor weight (3 points) for each condition that is met, up to −3 points for all three conditions.

Figure 5:
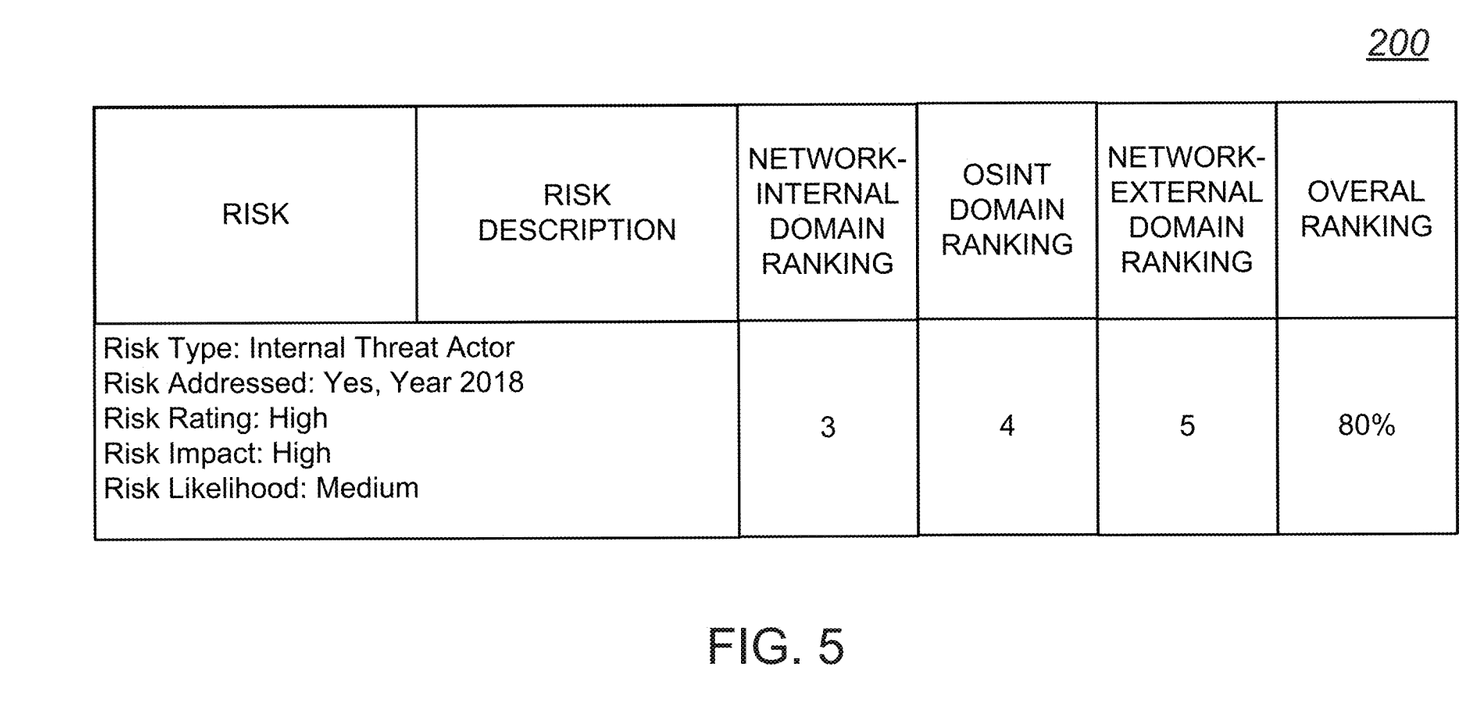
FIG. 5 shows an example a risk ranking that can be provided by the network security solution in FIG. 1 using the weighting system in FIG. 4.

FIG. 5 shows an example a risk ranking 200 that can be provided by the NS system 20 by applying the weight system in FIG. 4. In the non-limiting example shown in FIGS. 4 and 5, the overall ranking (or prioritization) for a risk is determined to be 80% (or 12 points out of a total 15 points). The risk is determined to be likely a high impact, high level, internal threat that has a medium level of likelihood to occur, which was last assessed or addressed in 2018.

Figure 3:
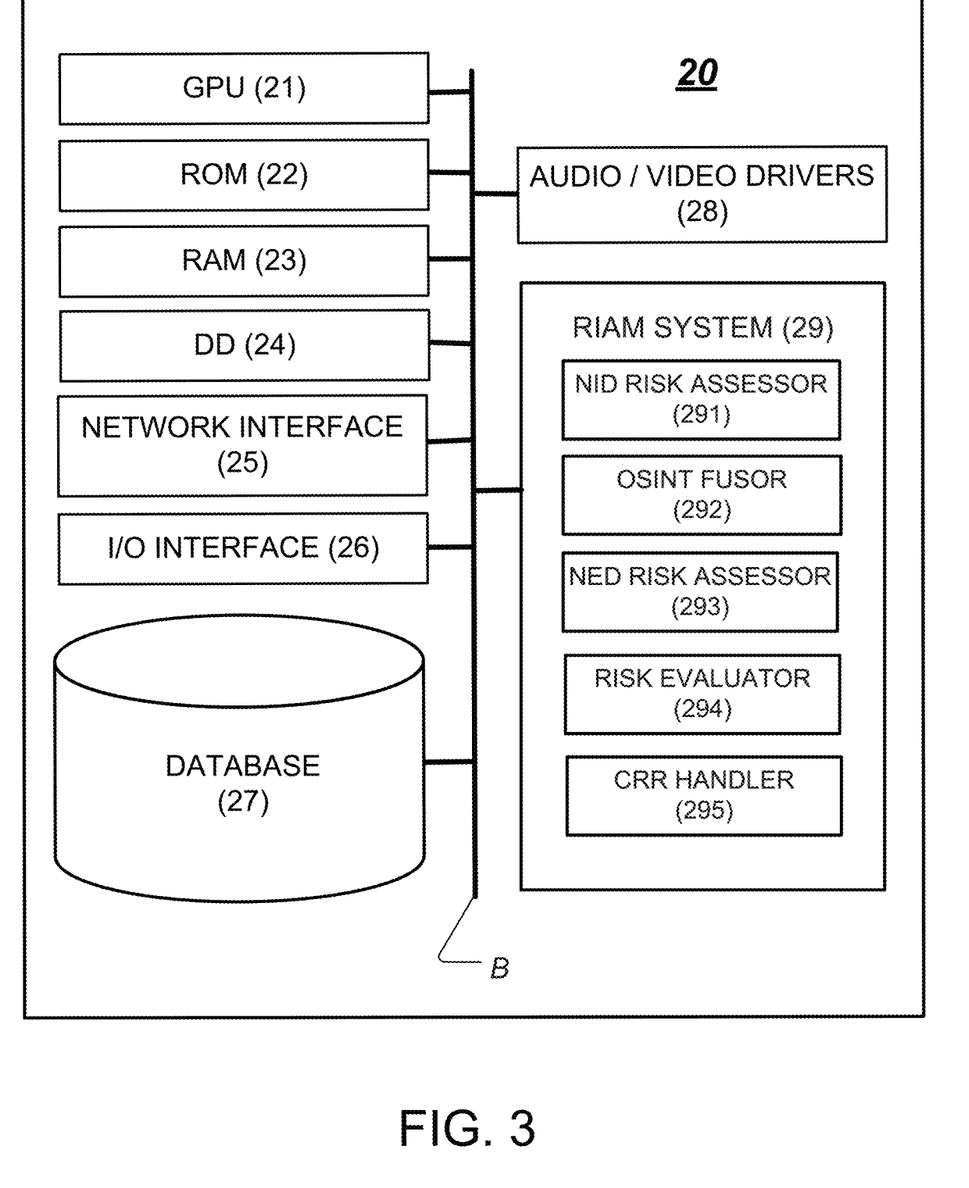
FIG. 3 shows an architecture of a network security system that can be included in the network security solution in FIG. 1.

FIG. 3 shows an architecture of a non-limiting embodiment of the NS system 20, according to the principles of the disclosure. The NS system 20 can include a graphic processor unit (GPU) 21, a read-only memory (ROM) 22, a random-access memory (RAM) 23, a disk drive (DD) 24, a network interface 25, or an input-output (I/O) interface 26, audio and video drivers 28, a database 27, and a risk identification and management (RIAM) system 29, each of which can be connected to a backbone B. The components in the NS system 20 can be connected to the backbone B via one or more communication links. The NS system 20 can be included in a server (not shown) located at, for example, node N5 (shown in FIG. 1) or a plurality of servers (not shown) located at a plurality of nodes.

The GPU 21 can be any of various commercially available processors. Dual microprocessors and other multiprocessor architectures can be employed as the GPU 21. The GPU 21 can be a central processing unit (CPU).

The NS system 20 includes a computer-readable medium that can hold executable or interpretable computer code (or instructions) that, when executed by the GPU 21 (or RIAM system 29), cause the steps, processes and methods described in this disclosure to be carried out. The computer-readable medium can be provided in the ROM 22, RAM 23, DD 24, database 27, or an external computer-readable medium connected to the NS system 20 via the network interface 25 or the I/O interface 26. The computer readable medium can include sections of computer code that, when executed by the GPU 21 (or the RIAM system 29) cause the risk assessment process 100 (shown in FIG. 2) to be carried out, and all other process steps described or contemplated in the specification.

A basic input/output system (BIOS) can be stored in a non-volatile memory in the NS system 20, such as, for example, the ROM 22. The ROM 22 can include a ROM, an erasable programmable read-only memory (EPROM), or an electrically erasable programmable read-only memory (EEPROM). The BIOS can contain the basic routines that help to transfer information between components within the NS system 20, such as during start-up. The RAM 23 can include a high-speed RAM such as static RAM for caching data, a parallel random-access machine, or any random-access storage.

The disk drive (DD) 24 can include a hard drive, such as, for example, an enhanced integrated drive electronics (EIDE) drive, a serial advanced technology attachments (SATA) drive, or any other high capacity fast hard drive. The DD 24 can include an optical disk drive that can read/write from/to a compact disk read-only memory (CD-ROM) disk (not shown), or, read from or write to other high capacity optical media such as a digital video disk (DVD). The DD 24 can be configured for external use in a suitable chassis (not shown). The DD 24 can be connected to the backbone b by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The DD 24 and associated computer-readable media can provide nonvolatile storage of data, data structures, or computer-executable instructions. The DD 24 can accommodate the storage of any data in a suitable digital format. The DD 24 can include one or more apps that are used to execute aspects of the architecture described in this disclosure.

A number of program modules can be stored in the DD 24, ROM 22, or RAM 23, including an operating system (not shown), one or more application programs (not shown), other program modules (not shown), and program data (not shown). Any (or all) of the operating system, application programs, program modules, and program data can be cached in the RAM 23 as executable sections of computer code.

The network interface 25 can be connected to the computer network 1 (shown in FIG. 1) or one or more external networks (not shown). The network interface 25 can include a wired or a wireless communication network interface (not shown) or a modem (not shown). When communicating in a local area network (LAN), the NS system 20 can be connected to the LAN network through the wired or wireless communication network interface; and, when communicating in a wide area network (WAN), the NS system 20 can be connected to the WAN network through the modem. The modem (not shown) can be internal or external and wired or wireless. The modem can be connected to the backbone B via, for example, a serial port interface (not shown).

The I/O interface 26 can receive commands and data from, for example, an operator via a user interface device (not shown), such as, for example, a keyboard (not shown), a mouse (not shown), a pointer (not shown), a microphone (not shown), a speaker (not shown), or a display (not shown). The received commands and data can be forward to the GPU 21 or RIAM system 29 from the I/O interface 26 as instruction and data signals via the backbone B.

The audio and video drivers 28 can include a graphics driver (not shown), a video adaptor (not shown), a video card (not shown), a sound card (not shown), or any other device necessary to render an image signal on a display device or an audio signal on a sound reproduction device (for example, speaker).

The RIAM system 29 can include a network-internal domain (NID) risk assessor 291, an OSINT fusor 292, a network-external domain (NED) risk assessor 293, a risk evaluator 294, and a computing resource risk (CRR) handler 295. The RIAM system 29 can be made as a single device or component (not shown), or the NID risk assessor 291, OSINT fusor 292, NED risk assessor 293, risk evaluator 294, and CRR handler 295 can be made as two or more separate devices or components (for example, five devices or components, as shown in FIG. 3). The RIAM system 29 can include one or more multi-layer neural networks.

The network interface 25 can include a data parser (not shown) or the data parsing operation can be carried out by the GPU 21. The network interface 25 can receive and parse data from data sources in each of the network-internal domain, OSINT domain, and network-external domain. Received data can be transferred from the network interface 25 to the RIAM system 29. For instance, after receiving and parsing data packets, the network interface 25 can send the network-internal domain data to the NID risk assessor 291, the OSINT domain data to the OSINT fusor 292, and the network-external domain data to the NED risk assessor 293.

The network interface 25 can facilitate communication between the RIAM system 29 and computing resources located internal or external to the computer network 10. The network interface 25 can handle a variety of communication or data packet formats or protocols, including conversion from one or more communication or data packet formats or protocols used by data sources to the communication or data packet formats or protocols used in the RIAM system 29.

The NID risk assessor 291 can include a computing device or it can be included in a computing device as a module. The NID risk assessor 291 can include a multi-layer neural network. The NID risk assessor 291 can analyze network-internal domain data and requirements related to the IT infrastructure for the computer network 10. The NID risk assessor 291 can link the requirements to the network-internal domain data and generate or populate the network risk register for a portion or the entire computer network 10. The NID risk assessor 291 can identify business-related risky computing resources. The network risk register can be stored in the NID risk assessor 291 or elsewhere in the NS system 20, such as, for example, in the DD 24 or database 27. The NID risk assessor 291 can analyze network-internal domain data, such as, for example, risk register log data, internal IT risk assessment data, and IT audit data and identify risks and risky computing resources. The NID risk assessor 291 can verify risks or risky computing resources based on network-internal domain data such as, for example, the IT risk assessment data. The NID risk assessor 291 can prioritize identified risks or risky computing resources. The NID risk assessor 291 can populate or coordinate with the risk evaluator to populate records, lists or tables with information adequate to identify, prioritize, describe or locate each risky computing resource, as well as associated risks. The NID risk assessor 291 can create or select keywords related to each risk or risky computing resource and weight each risk or risky computing resource according to requirements for the IT infrastructure.

The network risk register can include risk data for each risky computing resource that is identified and analyzed by, for example, an IT risk management function in the NID risk assessor 291. The analysis results can include identification information for each risky computing resource, such as, for example, an IP address, a device name, a device location, a file name, a file location, a program name, a program location, or any other information that can identify the computing resource or its location. The risks or risky computing resources can be prioritized based on severity, urgency, or potential impact. The network risk register can be accessed and analyzed to identify risks or risky computing resources. The network risk register can include a searchable or sortable database, list or table, which can include common strategic IT risks or risky computing resources related to the IT infrastructure. The network risk register can include catalogues of risks or risky computing resources that are catalogued according to common risk types and IT domains. The network risk register can include information that identifies each risk or risky computing resource, an analysis of severity of each risk, and an evaluation of potential solutions to be applied for each risk to remediate the risk; and, where the identified risks or risky computing resources have been penetration tested, the network risk register can include information that identifies and summarizes the results of the penetration testing for each risk or risky computing resource, the results of the analysis of severity of each risk, the results of the penetration testing solutions applied, or the results of the evaluation or implementation of risk remediation solutions for each risk or risky computing resource.

The network risk register can be populated with information gleaned from internal risk audits. The network risk register can include results of prior penetration testing solutions executed in the computer network 10.

The OSINT fusor 292 can include a computing device or it can be included in a computing device as a module. The OSINT fusor 292 can include a multi-layer neural network. The OSINT fusor 292 can generate queries and search data sources in the OSINT domain, such as, for example, the Internet, dark web, deep web, surface web, or any other network to identify information such as, for example, communities targeting certain entities or enterprises, their motives, and their means (capabilities) to reach a certain IT risk or business risk through IT infrastructure threat use cases. The OSINT fusor 292 can interact with OSINT data fusion tools. Searching by the OSINT fusor 292 can be initially based on risks or risky computing resources identified by the NID risk assessor 291. The OSINT fusor 292 can use OSINT tactics to profile risks and risky computing resources and identify computing resources that might be exploitable as access points to the computer network 10. In addition, the OSINT fusor 292 can build additional details in the identified use cases from the results of the analyses carried out by the NID risk assessor 291.

The NED risk assessor 293 can include a computing device or it can be included in a computing device as a module. The NED risk assessor 293 can include a multi-layer neural network. The NED risk assessor 293 can search data sources in the network-external domain, such as, for example, web data feeds from leading industrial web feeds to glean information regarding known cyber-attacks, including technical explanations for the utilized payloads and exploitation techniques. The NED risk assessor 293 can analyze the network-external domain data to determine and identify relationships between information gleaned from the network-external domain data (for example, web feeds) with information gleaned from the results of the analysis carried out by the NID the risk assessor 291 or OSINT fusor 294.

The risk evaluator 294 can include a computing device or it can be included in a computing device as a module. The risk evaluator 294 can include a multi-layer neural network. The risk evaluator 294 can include a weighting system (for example, shown in FIG. 4). The risk evaluator 294 can communicate with and coordinate, or control communication between each of the NID risk assessor 291, OSINT fusor 292, and NED risk assessor 293. The risk evaluator 294 can conduct analysis based on the results of the NID risk assessor 291, OSINT fusor 292, and NED risk assessor 293, or it can coordinate execution of certain tasks such as, for example, weighting of analysis results with the NID risk accessor 291, OSINT fusor 292, or NED risk assessor 293. For instance, the risk evaluator 294 can coordinate with the NED risk assessor 293 to generate penetration testing solutions (or to select previously generated penetration testing solutions) for identified and prioritized risks or risky computing resources, and to target risky computing resources for penetration testing. Referring to the process 100 (shown in FIG. 2), the risk evaluator 294 can carry out the weighting process in Steps 130, 145 or 165.

The risk evaluator 294 can mature each use case in the RIAM system 29 to the best version to identify risky computing resources or risks based on organizational business needs, adversary motives, adversary capabilities, and industrial trends that are gleaned from the network-internal domain, OSINT domain, and network-external domain by the RIAM system 29, or, more specifically, the NID risk assessor 291, OSINT fusor 292, and NED risk assessor 293, respectively. The risk evaluator 294 can employ the multi-layer neural network to communicate with and coordinate, or control communication between each of the NID risk assessor 291, OSINT fusor 292, and NED risk assessor 293, to model the computer network 10, including high priority risks and risky computing resources. The neural network can facilitate efficiently and effectively (i) identifying risky computing resources or risk, (ii) prioritizing identified risky computing resources or risks consistent with the IT or business needs for the computer network 10, (iii) verifying prioritized risky computing resources or risks, and (iv) generating or selecting penetration testing solutions. The resultant data, including models and parameters, can be stored in the database 27 and continuously updated to train the neural network and maintain an accurate risk model of the computer network 10. In this regard, the database 27 can store risks, risk profiles, penetration testing solutions (including tactics, techniques, and procedures), risk remediation solutions, and other security-related information that might be needed to train and maintain the risk model up to date.

The CRR handler 295 can include a computing device or it can be included in a computing device as a module. The CRR handler 295 can include a multi-layer neural network. The CRR handler 295 can communicate with the risk evaluator 294, or it can communicate with and coordinate, or control communication between each of the NID risk assessor 291, OSINT fusor 292, NED risk assessor 293, and risk evaluator 294. The CRR handler 295 can penetration test a subset (or all) of the risky communication resources or risks identified and prioritized by the NID risk assessor 291, OSINT fusor 292, or NED risk assessor 293, or the risk evaluator 294, based on the generated or selected penetration testing solution. The CRR handler 295 can generate or select risk remediation solutions for each evaluated risk or risky computing resource and remediate each evaluated risk or risky computing resource or transmit data or instructions to an analyst computing resource that are necessary to analyze or remediate the evaluated risks or risky computing resources.

The NS system 20 can provide a framework for selecting and executing offensive cybersecurity exercises based on three major knowledgebase domains—network-internal domain, OSINT domain, and network-external domain. The NS system 20 can provide efficient and effective offensive cybersecurity testing and evaluation to protect computer networks and raise the effectiveness of enterprise security posture assessments and offensive cybersecurity planning and execution.

The terms "a," "an," and "the," as used in this disclosure, means "one or more," unless expressly specified otherwise.

The term "backbone," as used in this disclosure, means a transmission medium that interconnects one or more computing resources to provide a path that conveys data signals and instruction signals between the one or more computing resources. The backbone can include a bus or a network. The backbone can include an ethernet TCP/IP. The backbone can include a distributed backbone, a collapsed backbone, a parallel backbone or a serial backbone. The backbone can include any of several types of bus structures that can further interconnect to a memory bus (with or without a memory controller), a peripheral bus, and a local bus using any of a variety of commercially available bus architectures.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

A "computing resource," as used in this disclosure, means any computing device, communicating device, computer program, computer application, application program interface, or any other software, firmware, or hardware that can receive, transmit or process an instruction or command or data.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network" or "subnetwork," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "node," as used in this disclosure, means a physical or virtual location in a computer network that comprises a computing resource.

The term "risk," as used in this disclosure, means a vulnerability in a computing resource or network that can be exploited to attain unauthorized access to the computing resource or network.

The term "server," as used in this disclosure, means any combination of software or hardware, including at least one application or at least one computer to perform services for connected clients as part of a client-server architecture, server-server architecture or client-client architecture. A server can include a mainframe or a server cloud or server farm. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission" or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for identifying and prioritizing a risky computing resource for security evaluation and remediation in a computer network that has a plurality of computing resources, the method comprising:
   analyzing network-internal domain information to identify the risky computing resource in the computer network;
   generating a list of at least one keyword related to a cyberattack risk or related to the risky computing resource;
   analyzing open source intelligence (OSINT) domain information using the keyword to identify risk attributes for the cyberattack risk;
   analyzing network-external domain information to identify additional risk attributes for the cyberattack risk;
   determining a ranking weight for the cyberattack risk based on the identified risk attributes determined by analyzing the OSINT domain information and the identified additional risk attributes determined by analyzing the network-external domain information,
      wherein determining the ranking weight comprises determining a network-internal domain ranking weight, a network-external domain ranking weight, and an OSINT domain ranking weight, and
      wherein the OSINT domain ranking weight comprises a reconnaissance weighting factor and a rationality weighting factor, based on whether the cyberattack risk is motivated by a malicious community;
   prioritizing the risky computing resource with respect to one or more computing resources in the plurality of computing resources based on the ranking weight;
   targeting the risky computing resource for penetration testing in accordance with the prioritization;
   evaluating a threat risk of the risky computing resource to the computer network; and
   applying a risk remediation solution to the risky computing resource using a computer resource risk (CRR) handler including a multi-level neural network to mitigate or remediate the threat risk,
   wherein the threat risk is exploitable by a threat actor computing device to gain access to the computer network through the risky computing resource.

2. The method in claim 1, further comprising:
   selecting a penetration testing solution based on the network-internal domain information, OSINT domain information, and network-external domain information.

3. The method in claim 1, further comprising:
   communicating with an analyst computing resource to apply a penetration testing solution to the risky computing resource.

4. The method in claim 1, wherein the analyzing the network-internal domain information to identify the risky computing resource in the computer network comprises analyzing an information technology risk register.

5. The method in claim 1, wherein analyzing the OSINT domain information using the keyword to identify risk attributes for the cyberattack risk comprises querying a plurality of external networks.

6. The method in claim 1, wherein the analyzing the network-external domain information to identify additional risk attributes for the cyberattack risk comprises receiving a security web feed and searching the security web feed based on the keyword.

7. The method in claim 1, wherein the determining the ranking weight for the cyberattack risk further comprises determining a sum of the network-internal domain ranking weight, network-external domain ranking weight, and OSINT domain ranking weight.

8. The method in claim 1, wherein the network-internal domain ranking weight comprises a recency weight factor and a risk weighting factor.

9. The method in claim 1, wherein the network-external domain ranking weight comprises a relevancy weighting factor and a likelihood weighting factor.

10. A network security system that identifies and prioritizes a risky computing resource for security evaluation and remediation in a computer network that has a plurality of computing resources, the system comprising:
    a network-internal domain (NID) risk assessor that identifies the risky computing resource from the plurality of computing resources in the computer network and generates a list of at least one keyword related to a cybersecurity risk or related to the risky computing resource;
    an open source intelligence (OSINT) fusor that determines first risk attributes for the cyberattack risk based on OSINT domain information based on the keyword;
    a network-external domain (NED) risk assessor that determines second risk attributes for the cyberattack risk based on network-external domain based on the keyword;
    a risk evaluator that determines a ranking weight for the cyberattack risk based on the first risk attributes and second risk attributes and targets the risky computing resource for penetration testing according to the ranking weight,
    wherein determining the ranking weight comprises determining a network-internal domain ranking weight, a network-external domain ranking weight, and an OSINT domain ranking weight,
    wherein the OSINT domain ranking weight comprises a reconnaissance weighting factor and a rationality weighting factor, based on whether the cyberattack risk is motivated by a malicious community,
    wherein the risk evaluator determines a threat risk of the risky computing resource to the computer network, and
    wherein the threat risk is exploitable by a threat actor computing device to gain access to the computer network through the risky computing resource; and
    a computer resource risk (CRR) handler including a multi-level neural network that applies a risk remediation solution to the risky computing resource to mitigate or remediate the threat risk.

11. The system in claim 10, wherein the OSINT fusor determines an additional keyword for the cyberattack risk.

12. The system in claim 11, wherein the NED risk assessor determines the second risk attributes for the cyberattack risk based on said keyword and said additional keyword.

13. A non-transitory computer readable storage medium storing network security evaluation and remediation program instructions for causing a risky security computing resource to be identified and prioritized amongst a plurality of computing resources in a computer network for security evaluation and remediation, the program instructions comprising the steps of:

analyzing network-internal domain information to identify the risky computing resource in the computer network;

generating a list of at least one keyword related to a cyberattack risk or related to the risky computing resource;

analyzing open source intelligence (OSINT) domain information using the keyword to identify risk attributes for the cyberattack risk;

analyzing network-external domain information to identify additional risk attributes for the cyberattack risk;

determining a ranking weight for the cyberattack risk based on the identified risk attributes determined by analyzing the OSINT domain information and the identified additional risk attributes determined by analyzing the network-external domain information,         wherein determining the ranking weight comprises determining a network-internal domain ranking weight, a network-external domain ranking weight, and an OSINT domain ranking weight, and         wherein the OSINT domain ranking weight comprises a reconnaissance weighting factor and a rationality weighting factor, based on whether the cyberattack risk is motivated by a malicious community;

prioritizing the risky computing resource with respect to one or more computing resources in the plurality of computing resources based on the ranking weight;

targeting the risky computing resource for penetration testing in accordance with the prioritization;

evaluating a threat risk of the risky computing resource to the computer network; and     applying a risk remediation solution to the risky computing resource using a computer resource risk (CRR) handler including a multi-level neural network to mitigate or remediate the threat risk,     wherein the threat risk is exploitable by a threat actor computing device to gain access to the computer network through the risky computing resource.

14. The non-transitory computer readable storage medium in claim 13, the program instructions comprising the further step of:

selecting a penetration testing solution based on the network-internal domain information, OSINT domain information, and network-external domain information.

15. The non-transitory computer readable storage medium in claim 13, the program instructions comprising the further step of:

communicating with an analyst computing resource to apply a penetration testing solution to the risky computing resource.

16. The non-transitory computer readable storage medium in claim 13, wherein the:

analyzing of the network-internal domain information to identify the risky computing resource in the computer network comprises analyzing an information technology risk register;

analyzing of the OSINT domain information using the keyword to identify risk attributes for the cyberattack risk comprises querying a plurality of external networks; and     analyzing of the network-external domain information to identify additional risk attributes for the cyberattack risk comprises receiving a security web feed and searching the security web feed based on the keyword.

\* \* \* \* \*